(12) United States Patent
Osamura et al.

(10) Patent No.: US 8,495,223 B2
(45) Date of Patent: Jul. 23, 2013

(54) ACCESS CONTROL METHOD, ACCESS CONTROL APPARATUS, AND ACCESS CONTROL PROGRAM

(71) Applicant: KAMOME Engineering, Inc., Tokyo (JP)

(72) Inventors: Kohji Osamura, Shinagawa-ku (JP); Takeshi Shiomura, Shinagawa-ku (JP)

(73) Assignee: KAMOME Engineering, Inc., Tokyo (JP)

( * ) Notice: Subject to any disclaimer, the term of this patent is extended or adjusted under 35 U.S.C. 154(b) by 0 days.

(21) Appl. No.: 13/727,830

(22) Filed: Dec. 27, 2012

(65) Prior Publication Data
US 2013/0117452 A1    May 9, 2013

Related U.S. Application Data

(63) Continuation of application No. PCT/JP2011/064802, filed on Jun. 28, 2011.

(30) Foreign Application Priority Data

Jun. 29, 2010 (JP) ................................ 2010-147425

(51) Int. Cl.
*G06F 15/16* (2006.01)
(52) U.S. Cl.
USPC ............ 709/227; 709/223; 709/225; 709/248
(58) Field of Classification Search
USPC .................. 709/223, 225, 227, 248
See application file for complete search history.

(56) References Cited

U.S. PATENT DOCUMENTS

| 7,028,073 | B1 * | 4/2006 | Bui et al. ....................... 709/203 |
| 8,089,986 | B2 * | 1/2012 | Adamczyk et al. ........... 370/468 |
| 8,204,996 | B2 * | 6/2012 | Kim et al. ..................... 709/227 |
| 2007/0086433 | A1 * | 4/2007 | Cunetto et al. ................ 370/352 |
| 2008/0195738 | A1 * | 8/2008 | Luo ............................... 709/227 |

FOREIGN PATENT DOCUMENTS

| JP | 2006-279375 A | 10/2006 |
| JP | 2007-164523 A | 6/2007 |
| JP | 2009-223674 A | 10/2009 |
| WO | 03/007160 A1 | 1/2003 |

OTHER PUBLICATIONS

Itochu Techno Science Kabushiki Kaisha, Electronic Commerce Suishinbu, CTC Enterprise, EC Solution; (Mission Critical na Bunsen Web Application o Jitsugen Suru);Business Communication; Aug. 1, 1998; vol. 35; No. 8; pp. 41 to 44; Japan.

* cited by examiner

*Primary Examiner* — Phuoc Nguyen
(74) *Attorney, Agent, or Firm* — Marvin A. Motsenbocker; MOTS LAW, PLLC

(57) ABSTRACT

An object is to reduce the loads on resources and to flexibly handle increase in access. An access control apparatus 1a includes: session data 21a in which an identifier of a user terminal, session information, and an update time are associated with each other; update means 12 for, upon receipt of an update request, storing updated [0]session information into the session data 21a in association with an update time, and broadcasting, to the other access control apparatuses, an synchronous update request that requests update of the session information of the identifier of the update-target user terminal; and synchronous update means 11 for, upon receipt of the synchronous update request from another access control apparatus, updating the session data 21a on the basis of the synchronous update request in association with the update time.

10 Claims, 13 Drawing Sheets

FIG. 5

| USER TERMINAL IDENTIFIER | SESSION INFORMATION | UPDATE TIME | LAST ACCESS TIME | LOCATION INFORMATION | SERVICE USE HISTORY | |
|---|---|---|---|---|---|---|
| A | ---- | ---- | ---- | ---- | ---- | ---- |
| B | ---- | ---- | ---- | ---- | ---- | ---- |
| C | ---- | ---- | ---- | ---- | ---- | ---- |
| D | ---- | ---- | ---- | ---- | ---- | ---- |
| ---- | ---- | ---- | ---- | ---- | ---- | ---- |

| USER TERMINAL IDENTIFIER | SERVICE ORDER | ---- |
|---|---|---|
| A | ---- | ---- |
| B | ---- | ---- |
| C | ---- | ---- |
| D | ---- | ---- |
| ---- | ---- | ---- |

| INQUIRY CONDITION | TIMEOUT: 3 SECONDS | RETRY: 2 TIMES | NUMBER OF INQUIRIES: 2 |
|---|---|---|---|
| REFERENCE NODE LIST | (1) 192.168.1.10 :1234 | OK | |
| | (2) 192.168.10.1 :5555 | OK | |
| | (3) 192.168.2.15 :2345 | OK | |
| | (4) 192.168.12.1 :1000 | OK | |

IP ADDRESS — PORT NUMBER — VALID FLAG

ACCESS CONTROL METHOD, ACCESS CONTROL APPARATUS, AND ACCESS CONTROL PROGRAM

CROSS-REFERENCE TO RELATED APPLICATIONS

This is a continuation Application of PCT International Application No. PCT/JP2011/064802 (filed Jun. 28, 2011), which in turn based upon and claims the benefit of priority from the Japanese patent Application No. 2010-147425 (filed Jun. 29, 2010); the entire contents of which are incorporated herein by reference.

TECHNICAL FIELD

The present invention relates to an access control method, an access control apparatus, and an access control program for use in an access control system including the access control apparatus which controls accesses of user terminals.

BACKGROUND ART

An access control system which accepts an access from a user terminal has been known. In a mobile phone communication network, this access control system accepts a connection request from a mobile phone, which is a user terminal, and permits a connection for the mobile phone. Moreover, when the mobile phone sends a service request to a service processing system, the access control system receives an inquiry regarding the status of the connection with the mobile phone from the service processing system. Further, the access control system sends the result to the service processing system.

Due to the development of information communication systems in recent years, there are increases in the number of user terminals, the number of connections in communication systems, and the number of service processing systems. Such increases have in turn increased processing loads on access control systems.

For example, for load balancing for access control, there is a communication method in which the packets in a series of communications are always routed to pass through the same path so that a TCP connection or a user session can be maintained (see Patent Document 1, for example). In this method described in Patent Document 1, each load balancer always distributes the packets in a series of communications to the same packet gateway, and the packet gateway distributes the packets in the series of communications to multiple service providing servers capable of executing the same service. In the communication method described in Patent Document 1, as described in page 11 in the description, a session management device manages the session of a series of packet exchanges started by an access of one mobile device to a network and ended at the end of necessary communications.

PRIOR ART DOCUMENT

Patent Document

Patent Document 1: International Patent Application Publication No. WO2003/007160

SUMMARY OF THE INVENTION

Problems to be Solved by the Invention

A usual access control system generally employs a method that causes a session management device to collectively manage sessions. If such a session management device is configured by a single server, that single server is responsible for the management of all the sessions. Thus, the load on the server is large. Meanwhile, the session management device may be configured by multiple servers in some cases. However, although the session management may be split among the multiple servers, it is usually the case that the session information will in the end be managed collectively in a single database. Thus, the toad on the database is large. Moreover, in the case of a failure in the server or database performing the collective management, the damage is severe.

As described above, in a usual access control system, load is imposed intensively on a particular server or the like, and therefore the whole system needs to be reinforced in advance to prepare for increase in access and for failures. Particularly, is order to maintain reliability, infrastructures need to be further augmented, which causes a problem of increasing the load on tire system.

Under such circumstances, an access control system which maintains reliability and also reduces the load on a resource, such as a server, has been desired to be developed.

Thus, an object of the present invention is to provide an access control method, an access control apparatus, and an access control program capable of reducing the load on a resource and also flexibly handling increase in access.

Means for Solving The Problems

A first feature of the present invention relates to an access control method for use in an access control system in which a plurality of access control apparatuses are connected bidirectionally by a communication network, each of the access control apparatuses including a session-data storage in which session information on a user terminal is recorded. Specifically, the access control method according to the first feature of the present invention comprises the steps of: causing any one of the plurality of access control apparatuses to receive an update request for session information; causing the access control apparatus having received the update request to update the session-data storage of the access control apparatus having received the update request in association with an update time; causing the access control apparatus having received the update request to broadcast a synchronous update request that requests update of the session information; and causing each of the access control apparatuses having received the synchronous update request to update the session-data storage of the access control apparatus having received the synchronous update request on the basis of the synchronous update request in association with the update time.

Here the access control method may further comprise the steps of: causing any one of the plurality of access control apparatuses to receive a reference request for the session information; causing the access control apparatus having received the reference request to acquire reference-target session information and the update time thereof from the session-data storage of the access control apparatus having received the reference request; causing the access control apparatus having received the reference request to send another access control apparatus a synchronous reference request that requests reference to the session information; causing the another access control apparatuses having received the synchronous reference request to acquire the reference-target session information and the update time thereof from the session-data storage of the another access control apparatus having received the synchronous reference request and to send the session information and the update time to the access control apparatus having received the reference request; and causing the access control apparatus having received the reference request to extract the latest session information by comparing the session information and the update time acquired from the session-data storage of the access control apparatus having received the reference request and the session information and the update time received from the another access control apparatuses having received the synchronous reference request, and to send the latest session information as a reference response in reply to the reference request.

Moreover, the access control method may further comprise the step of causing the access control apparatus having received the reference request to store the latest session information into the session-data storage of the access control apparatus having received the reference request.

Moreover, the access control method may further comprise the steps of: causing each of the access control apparatuses having received the synchronous update request to send a synchronous update response to the access control apparatus having received the update request in reply to the synchronous update request after updating the session-data storage of the access control apparatus having received the synchronous update request; and causing the access control apparatus having received the update request to send an update response in reply to the update request upon receipt of a predetermined number or more of the synchronous update responses.

A second feature of the present invention relates to an access control apparatus for use in an access control system including a plurality of the access control apparatuses which record session information on a user terminal. Specifically, the access control apparatus according to the second feature of the present invention comprises: a session-data storage that stores session data in which an identifier of a user terminal, session information, and an update time are associated with each other; an update unit that, upon receipt of an update request containing the identifier of an update-target user terminal and updated session information, stores the updated session information into the session-data storage in association with an update time, and broadcasts a synchronous update request that requests update of the session information of the identifier of the update-target user terminal; and a synchronous update unit that, upon receipt of the synchronous update request from another access control apparatus, updates the session-data storage on the basis of the synchronous update request in association with the update time.

Here, the access control apparatus may further comprise: a reference unit that, upon receipt of a reference request, acquires reference-target session information and the update time thereof from the session-data storage and sends a synchronous reference request to another access control apparatus, and also acquires the reference-target session information and the update time thereof from the another access control apparatus having received the synchronous reference request, extracts the latest session information by comparing the session information and the update time acquired from the session-data storage and the session information and the update time received from the another access control apparatuses having received the synchronous reference request, and sends the latest session information as a reference response in reply to the reference request; and a synchronous reference unit that, upon receipt of the synchronous reference request from another access control apparatus having received the reference request, acquires the reference-target session information and the update time thereof from the session-data storage and sends the session information and the update time to the another access control apparatus having received the reference request.

Moreover, the reference unit may further store the latest session information into the session-data storage.

Moreover, when the update is complete, the synchronous update unit may further send a synchronous update response to the any of the other access control apparatuses in reply to the synchronous update request, and upon receipt of a predetermined number or more of the synchronous update responses, the update unit may further send an update response in reply to the update request.

Upon receipt of the predetermined number or more of the synchronous update responses, the update unit may further record in log data that the synchronous update request has been broadcast successfully.

Moreover, the access control apparatus may further comprise a reference-node-data storage for storing reference node data in which the identifiers of sending-destination nodes of the reference request are stored, in which the reference unit may send the synchronous reference request to the nodes stored in the reference node data.

Moreover, the access control apparatus may further comprise a reference-node update unit that removes, from the reference node data, the identifier of the sending-destination node which is unable to receive the reference request.

A third feature of the present invention relates to access control program being on a non-transitory computer-readable storage medium for use in an access control apparatus in an access control system including a plurality of the access control apparatuses which record session information on a user terminal. Specifically, the access control program according to the third feature of the present invention comprises: a session-data storage that stores session data in which an identifier of a user terminal, session information, and an update time are associated with each other; an update unit that, upon receipt of an update request containing the identifier of an update-target user terminal and updated session information, stores the updated session information into the session-data storage in association with an update time, and broadcasts a synchronous update request that requests update of the session information of the identifier of the update-target user terminal; and a synchronous update unit that, upon receipt of the synchronous update request from another access control apparatus, updates the session-data storage on the basis of the synchronous update request in association with the update time.

Effect of the Invention

According to the present invention, it is possible to provide an access control method, an access control apparatus, and an access control program capable of seducing the load on a resource and also flexibly handling increase in access.

BRIEF DESCRIPTION OF THE DRAWINGS

FIG. 5 is a diagram describing the data structure of session data in the access control apparatus according to the embodiment of the present invention.

FIG. 6 is a diagram describing the data structure of reference node data in the access control apparatus according to the embodiment of the present invention.

FIG. 7 is a diagram describing the data structure of service order data in the access control apparatus according to the embodiment of the present invention.

MODES FOR CARRYING OUT THE INVENTION

Figure 1:
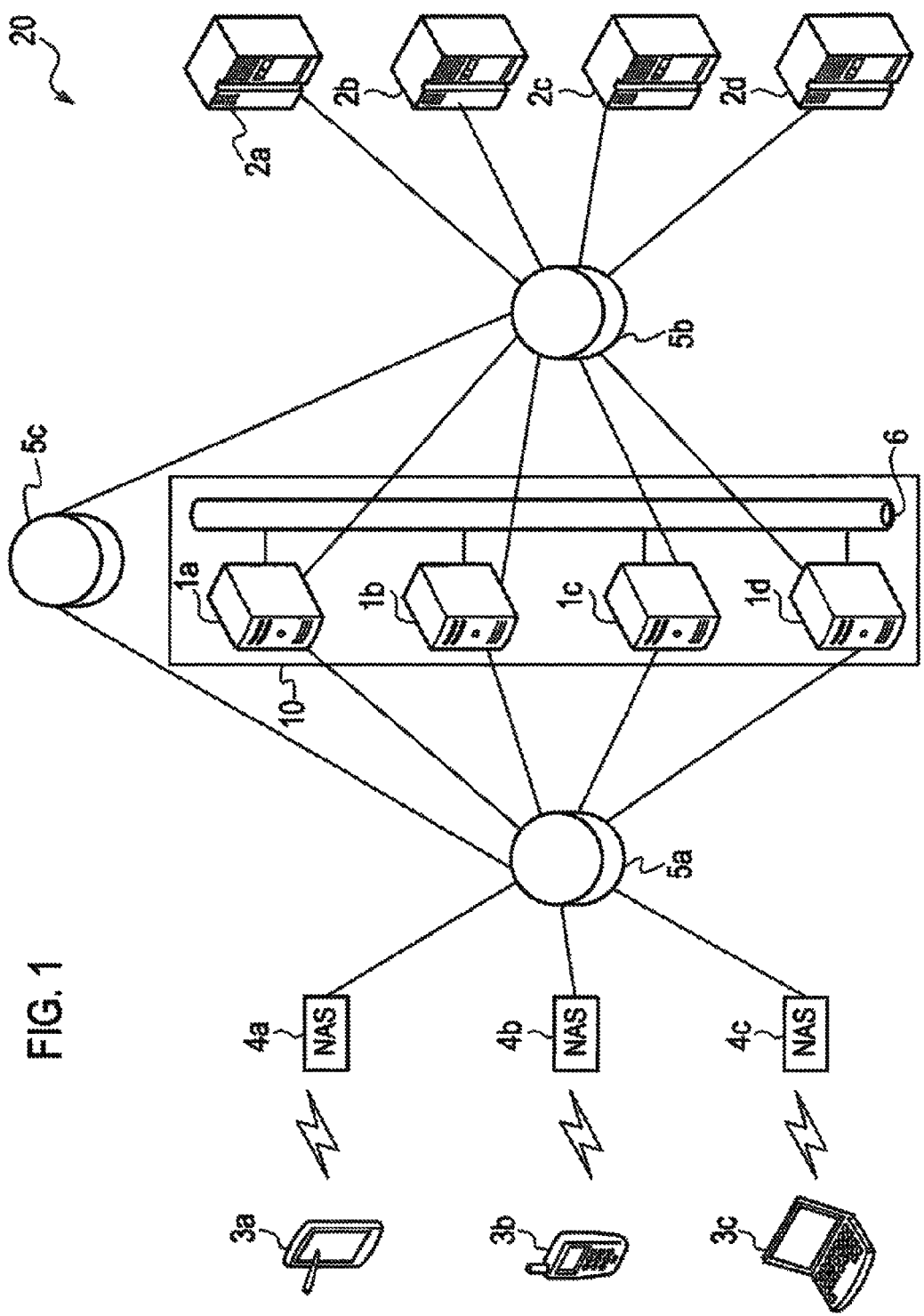
FIG. 1 is a diagram describing the system configuration of a communication system according to the embodiment of the present invention.

Next, an embodiment of the present invention will be described with reference to the drawings. In the following description of the drawings, the same or similar portions are denoted by the same or similar reference numerals.
(Communication System)

A communication system 20 according to the embodiment of the present invention will be described with reference to FIG. 1.

The communication system 20 includes service processing systems 2a, 2b, 2c, and 2d, user terminals 3a, 3b, and 3c, NASes 4a, 4b, and 4c, and an access control system 10. In the example shown in FIG. 1, there are four service processing systems 2, three user terminals 3, three NASes 4, and four access control apparatuses 1 in the access control system 10. However, the quantities may be larger or smaller. In this embodiment, the service processing systems 2a, 2b, 2c, and 2d may be described simply as the service processing system (s) 2 when the service processing systems 2a, 2b, 2c, and 2d are not particularly distinguished from one another. Likewise, the user terminals 3a, 3b, and 3c may be described as the user terminals) 3, and the NASes 4a, 4b, and 4c may be described as the RAS(es) 4.

The NAS 4 and the access control system 10 are connected by a communication network 5a in such a way as to be capable of communicating with each other bidirectionally. The access control system 10 and the service processing system 2 are connected by a communication network 5b in such a way as to be capable of communicating with each other biderectionally. The communication network 5a and the communication network 5b are connected by a communication network 5c in such a way as to be capable of communicating with each other. The communication network 5a, the communication network 5b, and the communication network 5e may be networks such as LANs provided individually. Alternatively, these communication networks may be a single network sharing a broadband communication network such as the Internet.

The user terminal 3 is a mobile phone, a computer with a communication card, or the like, for example. The user terminal 3 can be connected to the service processing system 2 through the NAS 4 and the access control system 10 to receive the service of the service processing system 2.

The NAS 4 is a network access server. The NAS 4 accepts a connection from the user terminal 3 and requests authentication to the access control system 10. If the user terminal 3 is authenticated, the NAS 4 connects the user terminal 3 to its connection destinations such as the communication networks 5b and 5c and the service processing system 2a. Here the NAS 4 sends the access control system 10 an update request containing information on the session between the user terminal 3 and the NAS 4 and makes the access control system 10 manage the session information. The NAS 4 is, for example, a GGSN (Gateway GPRS Support Node) in a case where the user terminal 3 is a mobile terminal such as a mobile phone compatible with 3G.

The service processing system 2 is a system which provides the user terminal 3 with a service on the basis of a service order. For example, the service processing system 2 provides the riser terminal 3 with a location-information providing service using GPS (Global Positioning System). When providing the user terminal 3 with the service, the service processing system 2 inquires the access control system 10 about a service order available to the user terminal 3 and its connection status.

The access control system 10 includes multiple access control apparatuses 1a, 1b, 1c, and 1d which record the session information on each user terminal 3. In the example shown in FIG. 1, the access control system 10 includes four access control apparatuses 1a, 1b, 1c, and 1d, but the quantity may be larger or smaller. In this embodiment, the access control apparatuses 1a, 1b, 1e, and 1d may be described simply as the access control apparatus(es) 1 when the access control apparatuses 1a, 1b, 1c, and 1d are not particularly distinguished from one another.

The access control system 10 is installed in a given location in a data center or the like, for example, and is connected to servers, terminals, and the like in remote locations through the communication networks 5a and 5b. The access control apparatus 1 includes a session-data storage part for managing the session between each user terminal 3 and its NAS 4. The session-data storage part is data in which an identifier of each user terminal 3, session information on the user terminal 3, and the time when this session information is updated are associated with each other.

In the example shown in FIG. 1, the access control system 10 includes the access control apparatuses 1a, 1b, 1c, and 1d. The access control apparatuses 1a, 1b, 1c, and 1d are connected to each other bidirectionally through an access control network 6. The access control network 6 is a high-speed network such as a LAN for connecting the access control apparatuses 1a, 1b, 1c, and 1d to each other bidirectionally. The access control network 6 is preferably installed separate from the communication networks 5a, 5b, and 5c. The access control apparatuses 1a, 1b, 1c, and 1d have a function of a RADIUS server for authentication of the user terminal 3 and manage the session information of the embodiment of the present invention.

In the access control system 10 according to the embodiment of the present invention, when a change is made in the session information on the user terminal 3, one of the multiple access control apparatuses 1 receives a change request, updates the session information, and also broadcasts a request to update the session information to the other access control apparatuses 1. Further, when one of the multiple access control apparatuses 1 receives a request that requests reference to the session information, the access control apparatus 1 having received the reference request acquires its own session information and also inquires the other access control apparatuses 1 to acquire the session information. The access control apparatus 1 finds the latest session information from among its own session information and the session information acquired from the other access control apparatuses 1. The access control apparatus 1 sends a reference response containing the latest session information in reply to the reference request.

According to the access control system 10 according to the embodiment of the present invention, the access control system 10 can maintain its reliability because any of the access control apparatuses 1 can send the reference response regardless of which access control apparatus 1 records the session information. Moreover, it is possible to flexibly handle increase in the number of access control apparatuses and failures in the access control apparatuses because of the configuration where any one of the access control apparatuses 1 performs the update and response. Accordingly, load balancing in the access control system 10 can be achieved easily.

A communication process by the communication system 10 according to the best mode for carrying out the present invention will be described with reference to FIG. 2. In the example shown in FIG. 2, described is a case where an update request based on a connection request is sent from the user terminal 3a to the access control system 10, and a reference request is then sent from the service processing system 2a. In the example shown in FIG. 2, described is an example where the NAS 4a receives a connection request from the user terminal 3a as an update request for session information and sends an update request for the session information to the access control system 10. Also, described is an example where the service processing system 2a sends a connection inquiry for inquiring the connection status of the user terminal 3a as a reference request for the session information. Note that the process is performed similarly also when the service processing system 2a sends an update request and the user terminal 3a sends a reference request.

First, in step S1, the user terminal 3a sends the NAS 4a a connection request when connecting to the NAS 4a. In step S2, the NAS 4a sends the access control system 10 an update request for the session information. This update request contains at least the identifier of the user terminal 3a.

Upon receipt of the update request, the access control system 10 updates the session information on the user terminal 3a in step S3. Specifically, upon receipt of the update request, the first access control apparatus 1a constituting the access control system 10 updates the session-data storage part of the first access control apparatus 1a in association with the update time. Further, the first access control apparatus 1a broadcasts a synchronous update request. The synchronous update request is a request to update the session information in the other access control apparatuses. The second access control apparatus 1b having received the synchronous update request updates the session-data storage part of the second access control apparatus 1b on the basis of the synchronous update request in association with the update time.

Here, the first access control apparatus 1a is an access control apparatus having received the update request. The second access control apparatus 1b is an access control apparatus other than the first access control apparatus 1a among the access control apparatuses 1 constituting the access control system 10.

After the update process in the access control system 10 is finished in step S3, the access control system 10 sends in step S4, an update response to the NAS 4a in reply to the update request in step S2. This update response indicates that the update of the session information has been complete. In step S5, the NAS 4a sends the user terminal 3a a connection response in reply to step S1. The user terminal 3a can now receive the service of the service processing system 2a.

If the user terminal 3a is to request the service of the service processing system 2a, the user terminal 3a sends a service request to the NAS 4a in step S6. This service request contains at least the identifier of the user terminal 3a and an identifier of the service in request. After the NAS 4a receives the service request, the NAS 4a sends, in step S7, a service request to the service processing system 2a which provides the service.

Upon receipt of the service request, the service processing system 2a sends a reference request inquiring the access control system 10 about the connection status of the user terminal 3a in step S8. This reference request contains at least the identifier of the user terminal 3a.

Upon receipt of the reference request, the access control system 10 refers to the session information on the user terminal 3a in step S9. Specifically, upon receipt of the reference request, the third access control apparatus 1c constituting the access control system 10 acquires the reference-target session information and its update time from the session-data storage part of the third access control apparatus 1c. Further, the third access control apparatus 1c sends a synchronous reference request to the fourth access control apparatus 1d. The synchronous reference request is a request that requests reference to the session information. The fourth access control apparatus 1d having received the synchronous reference request acquires the reference-target session information and its update time from the session-data storage part of the fourth access control apparatus 1d and sends them to the third access control apparatus 1c. The third access control apparatus 1c in turn compares the session information and the update time acquired from the third session-data storage part and the session information and the update time received from the fourth access control apparatus 1d to determine the latest session information and thereby acquires the latest session information. In this event, the third access control apparatus 1c may store the latest session information into the session-data storage part of the third access control apparatus 1c.

Here, the third access control apparatus 1c is an access control apparatus having received the reference request. The fourth access control apparatus 1d is an access control apparatus other than the third access control apparatus 1d among the access control apparatuses 1 constituting the access control system 10.

After the access control system 10 acquires the latest session information in step S9, the access control system 10 sends, in step S10, a reference response to the service processing system 2a in reply to the reference request in step S8. This reference response contains the latest session information on the user terminal 3a.

In step S11, the service processing system 2a sends the NAS 4a a service response in reply to the service request in step S7, on the basis of the latest session information received in step S10. Upon receipt of the service response, the HAS 4a sends a service response to the user terminal 3a in step S12.

Figure 2:
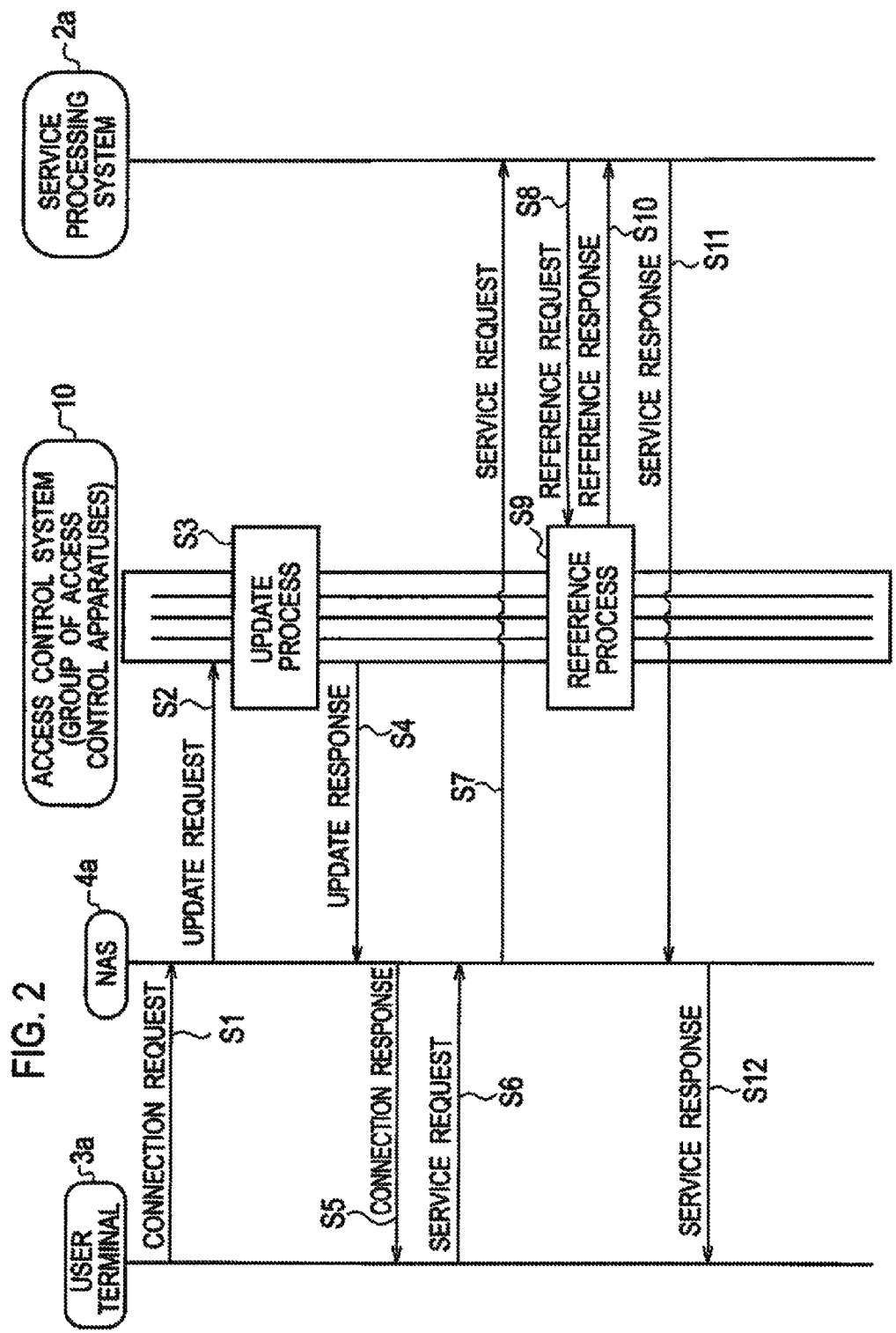
FIG. 2 is a sequence diagram describing operations of the communication system according to the embodiment of the present invention.

The example shown in FIG. 2 is described using the first access control apparatus 1a to the fourth access control apparatus 1d. However, it may suffice that the first access control apparatus 1a and the second access control apparatus 1b be different and that the third access control apparatus 1c and the fourth access control apparatus 1d be different. For example, it may suffice that the access control apparatus which receives the update request and the access control apparatus which receives the synchronous update request be different and that the access control apparatus which receives the reference request and the access control apparatus which receives the synchronous reference request be different. Accordingly, the process of the first access control apparatus 1a and the process of the third access control apparatus 1c may be executed by the same access control apparatus, and the process of the second access control apparatus 1b and the process of the fourth access control apparatus 1d may be executed by the same access control apparatus. In another example, the process of the first access control apparatus 1a and the process of the fourth access control apparatus 1d may be executed by the same access control apparatus, and the process of the second access control apparatus 1b and the process of the third access control apparatus 1c may be executed by the same access control apparatus.

(Access Control Apparatus)

Figure 3:
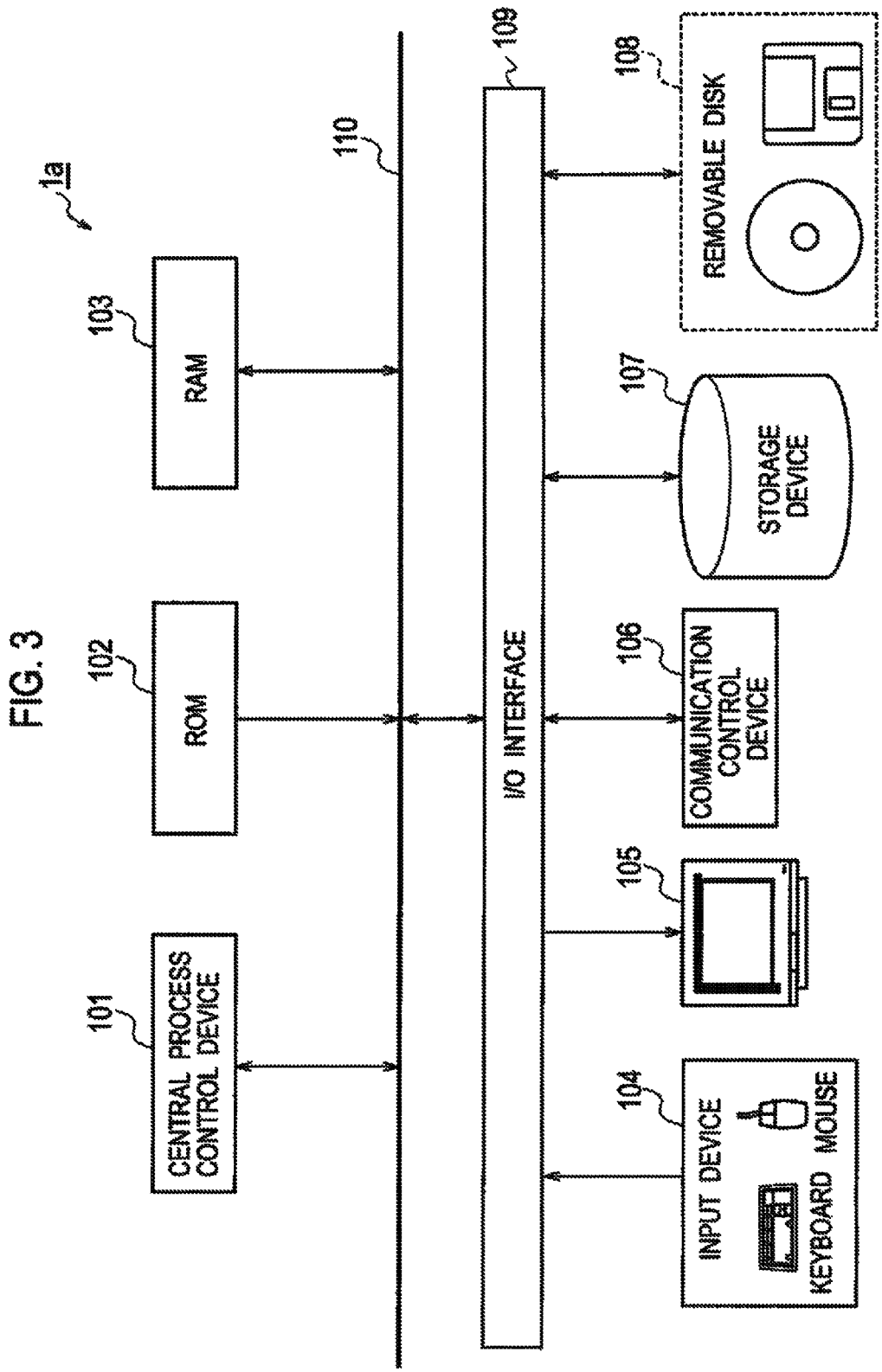
FIG. 3 is a diagram describing the hardware configuration of each access control apparatus according to the embodiment of the present invention

As shown in FIG. 3, in each access control apparatus 1 according to the embodiment of the present invention, a central process control device 101, a ROM (Read Only Memory) 102, a RAM (Random Access Memory), and an I/O interface 109 axe connected by a bus 110. Connected to the I/O interface 109 are an input device 104, a display device 103, a communication control device 106, a storage device 107, and a removable disk 108.

The central process control device 101 reads out a boot program for booting the access control apparatus 1 from the ROM 102 on the basis of an input signal from the input device 104 and executes the boot program. Further, the central process control device 101 reads out an operating system stored in the storage device 107. Meanwhile, the central process control device 101 is a processing device which: controls devices on the basis of input signals from the input device 104, the communication control device 106, and the like; reads out a program and data stored in the RAM 103 and the storage device 107 and load them onto the RAM 103; and implements a series of processes described later such as data calculation and processing on the basis of commands of the program read out from the RAM 103.

The input device 104 is constituted of input devices such as a keyboard and a mouse through which the operator inputs various operations. Based on the operator's operations, the input device 104 generates and sends input signals to the central process control device 101 through the I/O interface 109 and the bus 110. The display device 105 is a CRT (Cathode Ray Tube) display, a liquid crystal display, or the like, and is a device which receives output signals to be displayed on the display device 105 from the central process control device 101 through the bus 110 and the I/O interface 109 and displays, for example, the result of a process performed fey the central process control device 101 and the like. The communication control device 106 is a device such as a LAN card or a modem which connects the access control apparatus 1 to a communication network such as the Internet or a LAN. Data sent or received by such a communication network through the communication control device 106 is sent or received by the central process control device 101 through the I/O interface 109 and the BUS 110 as an input single or an output signal.

The storage device 107 is a semiconductor storage device or a magnetic disk device and stores programs and data to be executed is the central process control device 101. The removable disk 108 is an optical disk or a flexible disk, and a signal read out from or written in the removable disk 108 by a disk drive is received or sent by the central process control device 101 through the I/O interface 109 and the bus 110.

Figure 4:
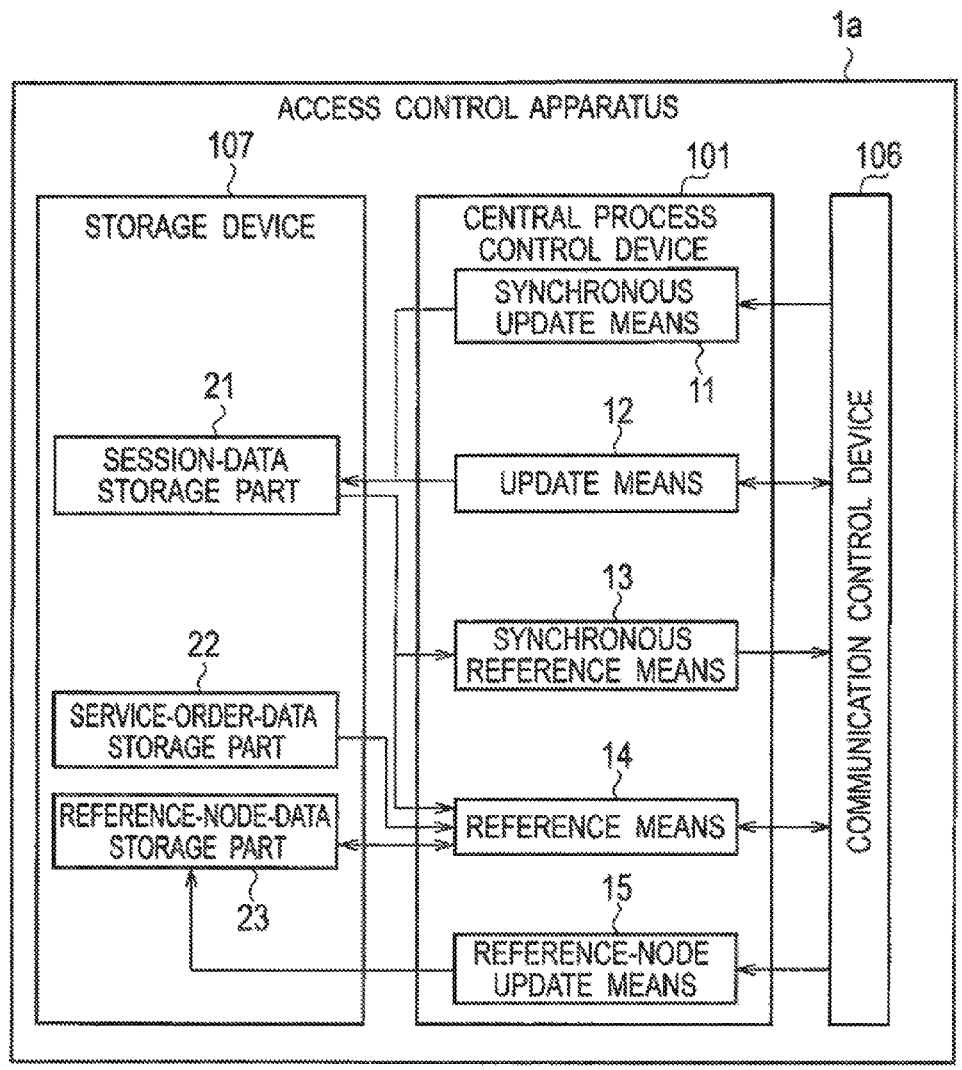
FIG. 4 is a diagram describing function blocks of the access control apparatus according to the embodiment of the present invention.

The storage device 107 of the access control apparatus 1 according to the embodiment of the present invention stores an access control program. Further, as shown in FIG. 4, the storage device 107 includes a session-data storage part 21, a service-order-data storage part 22, and a reference-node-data storage part 23. Moreover, as the central process control device 101 of the access control apparatus 1 reads and executes the access control program, synchronous update means 11, update means 12, synchronous reference means 13, reference means 14, and reference-node update means 15 are implemented in the central process control device 101 of the access control apparatus 1.

The session-data storage part 21 is a storage area in the storage device 107 storing session data 21a. The session data 21a is the session information on the user terminal(s) 3 managed by the access control system 10. In the embodiment of the present invention, the session data 21a may not necessarily store the session information on all the user terminals to be managed by fee access control system 10 and may store the session information on some user terminals. It may suffice that one session data 21a among all the session data 21a of all the access control apparatuses 1 constituting the access control system 10 store the session information on all the user terminals managed by the access control system 10.

The session data 21a has a data structure shown in FIG. 5, for example. The session data 21a is data in which, for example, the identifier of each user terminal 3, the session information, and the update time are associated with each other. The session data 21a may also record data related to the provision of the service such as location information on the user terminal 3, information on its service use history, etc. in association with the identifier of the user terminal 3. Here, the session information, is information in which a session ID to identify a session, the identifier of the connection-target user terminal 3, an identifier of a connection-destination node of the user terminal 3, and the like are associated with each other.

The service-order-data storage part 22 is a storage area in the storage device 107 storing service order data 22a. As shown in FIG. 6, the service order data 22a is data in which the identifier of each user terminal 3 and the service order of the user terminal 3 are associated with each other. Here, the service order is a hand allocated to the user terminal 3, information on a contracted service for the user terminal 3, information on the authority of the user terminal 3, information on an access filter, or the like. This service order data 22a is periodically updated as hatch processing by a server managing the service order.

The reference-node-data storage part 23 is a storage area in the storage device 107 storing reference node data 23a. The reference node data 23a is data in which the access control apparatus 1 records connection-destination nodes to send a synchronous reference request and an inquiry condition. The synchronous reference means 13 described later sends the synchronous reference request in accordance with the reference nodes and the inquiry condition recorded in the reference node data 23a.

The reference node data 23a has a data structure and data as shown in FIG. 7. The reference node data 23a contains an inquiry condition for sending a synchronous reference, request, and a reference node list. The inquiry condition includes: timeout during inquiry; the number of retries indicating the number of times a synchronous reference request is re-sent after the timeout; and the number of inquiries indicating the number of nodes to send the synchronous reference request. The reference node list is multiple combinations of the IP addresses and port numbers of the other access control apparatuses to be referred to. Further, a valid flag indicating whether or not to inquire the node may be provided. The inquiry condition in the reference node data 23a is determined based on the scale, reliability, the number of accesses, and the like of the access control system 10. For example, the number of inquiries is set to a large number when the scale of the access control system 10 is large and the required reliability thereof is high.

For example, in a case where "timeout: 3 sec, number of retries: 2, number of inquiries: 2" as shown in FIG. 7, the synchronous reference means 13 selects two nodes from the reference node list and sends a synchronous reference request to the selected nodes, in a case where (1) to (4) in the reference node list are all capable of communications, the synchronous reference means 13 first inquires (1) and (2) is the reference node list. When next sending the synchronous reference request, the synchronous reference means 13 inquires (3) and (4) in the reference node list.

The timeout is determined to be reached in a case where no response is sent back from, for example, the node (2) within three seconds after sending the synchronous reference request to (1) and (2) in the reference node list. In this case, the synchronous reference means 13 retries the sending to the node (2). If the number of retries exceeds two, the synchronous reference means 13 determines that a communication cannot be performed with the node (2), and thus the node (2) is excluded from the reference destinations. The synchronous reference means 13 may, for example, remove the information on the node (2) from the reference node list or change the valid flag associated with the node (2) to "not inquirable." In this case, the synchronous reference request is not sent to the node (2) but is sent to the nodes (1) and (3), for example.

Next, each processing means implemented in the central process control device 101 will be described with reference to FIG. 4.

Upon receipt of a synchronous update request from another access control apparatus 1, the synchronous update means 11 updates the session-data storage part 21 on the basis of the synchronous update request in association with an update time. The synchronous update request is broadcast from the access control apparatus 1 having received an update request. The synchronous update request contains the identifier of the update-target user terminal, the updated session information, and the update time. This update time is the time when the access control apparatus 1 having received the update request updated the session information. The synchronous update means 11 searches the session data 21a and updates the session information corresponding to the update-target user identifier to the updated session information. Further, the synchronous update means 11 updates the update time corresponding to the update-target user identifier to the update time contained in the synchronous update request. In a case where the session data 21a does not contain any information on the update-target user identifier, the synchronous update means 11 newly creates a record in which the identifier of the update-target user terminal, the updated session information, and the update time are associated with each other and inserts the record into the session data 21a.

Further, when the update of the session data 21a is complete, the synchronous update means 11 sends a synchronous update response to the other access control apparatus 1 in reply to the synchronous update request received from that access control apparatus 1.

Upon receipt of an update request containing the identifier of the user terminal whose session information is to be updated and the updated session information, the update means 12 stores the updated session information into the session-data storage part 21 in association with an update time. This update time is the time when the update means 12 stores the updated session information into the session-data storage part 21. Further, the update means 12 broadcasts a synchronous update request that requests update of the session information of the identifier of the update-target user terminal to the other access control apparatuses 1. For example, when the access control system 10 includes 10 access control apparatuses 1, the update means 12 broadcasts a synchronous update request to the 9 access control apparatuses 1 excluding the own access control apparatus.

In this event, if receiving a predetermined number of synchronous update responses or more, the update means 12 may further send an update response in reply to the update request. Furthermore, if receiving the predetermined number of synchronous update responses or more, the update means 12 may record in log data (not shown) that the synchronous update request has been broadcast successfully. In the embodiment of the present invention, the synchronous update request is broadcast. The update means 12 can confirm that the synchronous update request has been successfully sent, by receiving synchronous update responses from other access control apparatuses 1. Here, the update means 12 may confirm that the synchronous update request has been successfully sent, by receiving the synchronous update responses from, for example, half or more of the access control apparatuses. Moreover, that the synchronous update request has been successfully sent may be recorded in a log, and the log may be referred to afterwards for an access analysis or the like.

When one update request is generated in the access control system 10 according to the embodiment of the present invention, either the synchronous update means 11 or the update means 12 of each access control apparatus 1 is involved in a process. Specifically, it is the update means 12 that performs the process in a case of the access control apparatus 1 receiving the update request. On the other hand, it is the synchronous update means 11 that performs the process in the case of each access control apparatus 1, among the access control apparatuses 1 other than the access control apparatus 1 having received the update request, that has received a synchronous update request from the access control apparatus 1 having received the update request.

The access control apparatus 1 according to the embodiment of the present invention updates the session data 21a of the access control apparatus 1 upon receipt of an update request. Further, the access control apparatus 1 broadcasts a synchronous update request to make the other access control apparatuses 1 perform the update similarly. As the synchronous update request is broadcast, the synchronous update means of given access control apparatuses 1 constituting the access control system 10 receive that synchronous update request and update their session data 21a.

Here, by the broadcasting, the access control apparatus 1 can send the synchronous update request widely. For example, those access control apparatuses 1 experiencing a failure may not be able to store the latest session information. On the other hand, the other access control apparatuses 1 operating normally can store the latest session information. Thus, by broadcasting the synchronous update request, the latest session information can be stored into multiple access control apparatuses 1 that are able to perform the update at that moment, without taking into account the status of each sending-destination access control apparatus.

Moreover, by the broadcasting, it is possible to immediately start the operation without having to change the settings of the existing access control apparatuses even if the number of the access control apparatuses constituting the access control system 10 increases. Furthermore, by the broadcasting, the synchronous update request can be sent to the other access control apparatuses 1 by use of a fixed amount of data regardless of the number of the access control apparatuses 1, unlike a case of specifying separate addresses.

Note that the use of broadcasting does not always allow all the other access control apparatuses 1 to store the latest session information. Thus, in the embodiment of the present invention, as will be described later, the access control apparatus 1 having received a reference request for session information acquires the session information from each of the other access control apparatuses 1 and sends the latest session information as a reference response.

Upon receipt of a synchronous reference request from another access control apparatus 1, the synchronous reference means 13 acquires the reference-target session information and its update time and sends them to the other access control apparatus 1. The synchronous reference request is sent from the access control apparatus 1 that has received a reference request. The synchronous reference request contains the identifier of the reference-target user terminal. The synchronous reference means 13 searches the session data 21a to acquire the session information corresponding to the reference-target user identifier and its update time, and further sends them to the access control apparatus 1 having sent the synchronous reference request as a synchronous reference response in reply to the synchronous reference request.

Upon receipt of a reference request, the reference means 14 acquires the reference-target session information and its update time from the session-data storage part 21. Further, the reference means 14 sends a synchronous reference request to the other access control apparatuses 1 and acquires the reference-target session information and its update time from each of the other access control apparatuses. The reference means 14 compares the session information and its update time acquired from the session-data storage part 21 and the session information and its update time received from each of the other access control apparatuses 1 and extracts the latest session information. The reference means 14 sends the latest session information as a reference response in reply to the reference request. In this event, if the session information acquired from the session-data storage part 21 is not the latest, the reference means 14 may further store the latest session information into its own session-data storage part 21 in association with the identifier of the reference-target user terminal. The reference means 14 may send a synchronous reference request to the nodes stored in the reference node data 23a to update the session information.

Use reference request the reference means 14 receives and the synchronous reference request the reference means 14 sends contain the identifier of the reference-target user terminal. The reference means 14 acquires the session information associated with the reference-target user terminal from the session data 21. Further, the reference means 14 sends the other access control apparatuses 1 a synchronous reference request containing the identifier of the reference-target user terminal. Here, the sending-destination access control apparatuses 1 are the nodes specified in the reference node data 23a. From the session information acquired from the session data 21a and the session information received from each of the other access control apparatuses 1, the reference means 14 acquires the session information associated with the latest update time as the latest session information.

When one reference request is generated in the access control system 10 according to the embodiment of the present invention, it is the update means 14 that is involved in a process in a case of one access control apparatus 1, among the access control apparatuses 1, that has received the reference request. On the other hand, it is the synchronous reference means 13 that performs the process in a case of each access control apparatus 1, among the access control apparatuses 1 other than the access control apparatus 1 having received the reference request, that has received a synchronous reference request from the access control apparatus 1 having received the reference request.

Here, the session data 21a stored in the access control apparatus 1a contains the above-described session information updated by the synchronous update means 11 and the above-described session information updated by the update means 12. Suppose, for example, a case where a synchronous update request is sent while the access control apparatus 1a is experiencing a failure and is therefore unable to perform communications. In this case, the access control apparatus 1a may possibly be unable use the synchronous update request to update the session data 21a, thereby holding older information. For this reason, the reference means 14 refers not only to the session data 21a stored in its own storage device but also to the session data stored in the other access control apparatuses 1. In this way, the reference means 14 can acquire the latest information from the multiple sets of session information on the basis of their update times to send a reference response. Meanwhile, it is possible that the session data 21a of the access control apparatus 1a may not have any session information on the reference-target user terminal. In this case, the reference means 14 acquires the latest information from the session information sent from the other access control apparatuses 1 to send a reference response.

As described above, in the embodiment of the present invention, a synchronous update request for session information is broadcast, and thus the session information is not always updated to the latest session information in all the access control apparatuses 1 constituting the access control system 10. For this reason, each access control apparatus 1 according to the embodiment of the present invention, upon receipt of a reference request, acquires the session information stored in its session-data storage part 21 and also acquires the session information stored in each of the other access control apparatuses 1 constituting the access control system 10. The access control apparatus 1 determines the latest session information on the basis of the update times of the acquired session information and sends that latest session information as a reference response. Thus, the access control apparatus 1 creates a reference response by not only using the session information in its own session-data storage part 21 but also inquiring the other access control apparatuses 1. In this way, the access control system 10 can, as a whole, send a reliable reference response even when there is art access control apparatus failing to update the session information.

The reference-node update means 15 updates the reference node data 23a. For example, if another system notifies that a gives access control apparatus is recovered, the reference-node update means 15 updates the reference node data 23a by adding information on that node to the reference node data 23a. In this way, the access control apparatus 1 can be controlled to send a synchronous reference request to the recovered access control apparatus as well.

Moreover, if a given access control apparatus becomes dysfunctional, the reference-node update means 15 updates the reference node data 23a by deleting information on that node from the reference node data 23a. In this way, the access control apparatus 1 can be controlled not to send a synchronous reference request to the dysfunctional access control apparatus. When the reference node data 23a includes the valid flag indicating whether or not to inquire the node, the reference-node update means 15 can update the valid flag to a valid state to recover the corresponding access control apparatus as a sending destination or update the valid flag to an invalid state to remove the corresponding access control apparatus from the sending destinations.

Next, a process of the access control system 10 according to the embodiment of the present invention will be described with reference to FIG. 8. In the example shown in FIG. 8, the access control system 10 includes the first access control apparatus 1a, the second access control apparatus 1b, the third access control apparatus 1c, and the fourth access control apparatus 1d. In the example shown in FIG. 8, the update means 12 of the first access control apparatus 1a receives an update request. The synchronous update means 11 of another access control apparatus 1b receives a synchronous update request from the first access control apparatus 1a.

Here, the update-target terminal identifier is assumed as "A." The session information associated with the terminal identifier "A" in the session data of each access control apparatus 1 is presented as "a"+ a revision number. In FIGS. 8 and 9, "a0" is the oldest session data, and "a1" is session date newer than "a0." "a2" is the latest session data to which session data is updated this time. The session information associated with the terminal identifier "A" in the session data of the first access control apparatus 1a and the third access control apparatus 1c is "a1." Moreover, the session information associated with the terminal identifier "A" in the session data of the second access control apparatus 1b and the fourth access control apparatus 1d is "a0."

First, in step S101, the first access control apparatus 1a receives an update request from, the NAS 4a. This opiate request contains the identifier "A" of the update-target terminal and the updated information "a2" being information after being updated. The first access control apparatus 1a changes the session information of the identifier "A" of the update-target terminal from "a1" to "a2" on the basis of the update request received in step S101. Further, in steps S103a, S103b, and S103c, the first access control apparatus 1a broadcasts a synchronous update request to the other access control apparatuses 1. This synchronous update request contains the identifier "A" of the update-target terminal, and the updated information "a2" being the information after being updated.

Upon receipt of the synchronous update request, the second access control apparatus 1b changes the session information of the identifier "A" of the update-target terminal from "a0" to "a2" in step S104. When the update is complete, the second access control apparatus 1b sends a synchronous update response to the first access control apparatus 1a in step S105 in reply to the synchronous update request received in step S103a.

Upon receipt of the synchronous update request, the third access control apparatus 1c changes the session information of the identifier "A" of the update-target terminal from "a0" to "a2" in step S106. When the update is complete, the third access control apparatus 1c sends a synchronous update response to the first access control apparatus 1a in step S107 in reply to the synchronous update request received in step S103b.

Upon receipt of the synchronous update request, the fourth access control apparatus 1d changes the session information of the identifier "A" of the update-target terminal from "a0" to "a2" in step S108. When the update is complete, the fourth access control apparatus 1d sends a synchronous update response to the first access control apparatus 1a in step S109 in reply to the synchronous update request received in step S103c.

After the update of the session data is complete in step S102, the first access control apparatus 1a sends an update response to the NAS 4a in reply to the update request received in step S101. Here, the first access control apparatus 1a may send the update response in step S110 upon receipt of synchronous update responses from a predetermined number of nodes among the second access control apparatus 1b, the third access control apparatus 1c, and the fourth access control apparatus 1d. The larger the number of nodes necessary for sending the update response, the higher the reliability of the access control system 10.

As described above, in the example shown in FIG. 8, the session information of the update-target terminal identifier is updated in all the access control apparatuses 1 of the access control system 10. In this case, the same session information can be acquired regardless of which apparatus receives the reference request. However, the synchronous update request is broadcast as described in connection with step S103 in FIG. 8. For this reason, the access control apparatus having received the update request cannot always send the synchronous update request to all the other access control apparatuses.

An example of this case will be described with reference to FIG. 9. In FIG. 9, the operations shows in steps S151 to S153 are the same as the operations in steps S101 to S103 in FIG. 8.

Figure 8:
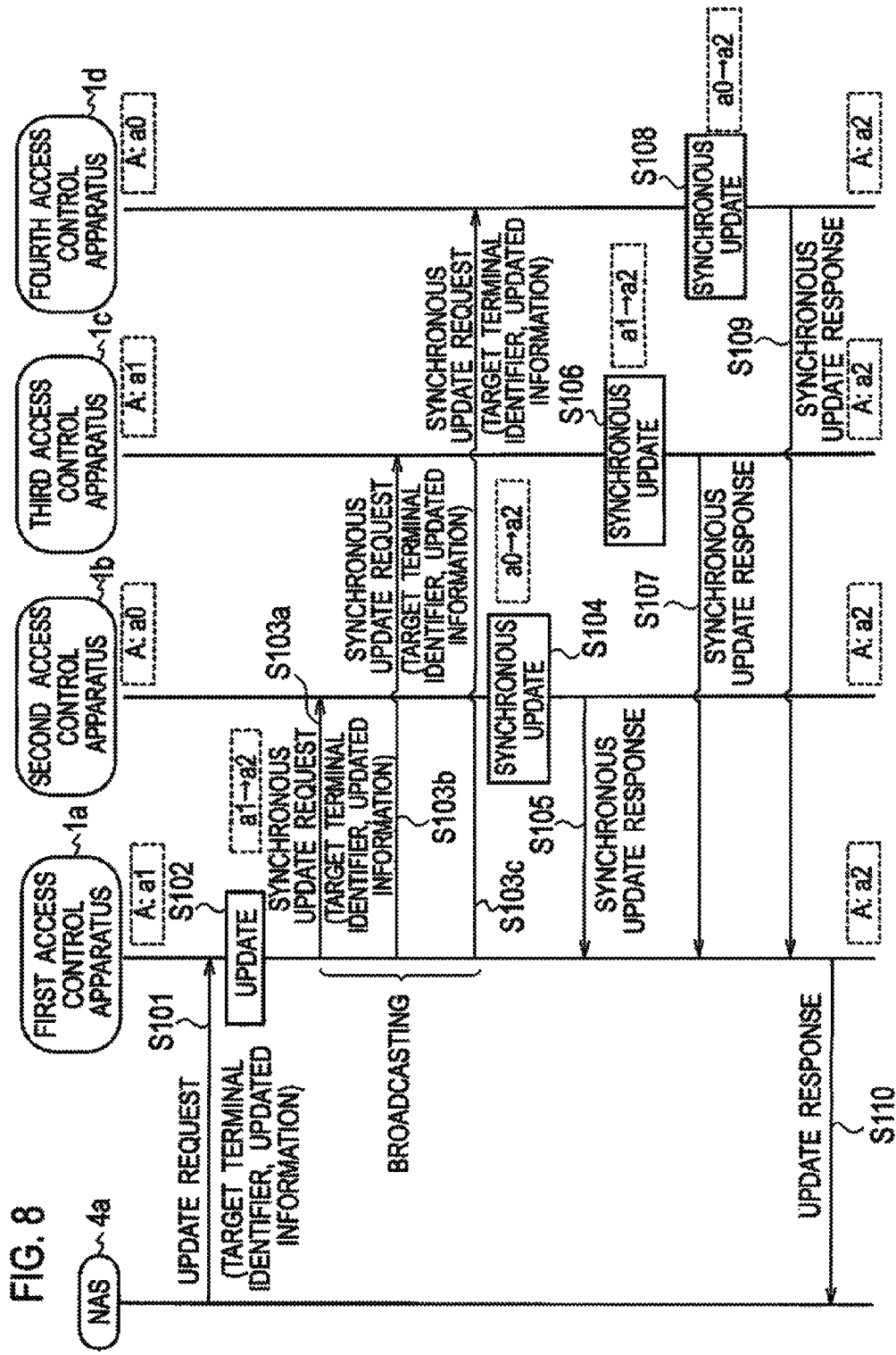
FIG. 8 is a sequence diagram describing operations of the access control system during an update process in the communication system according to the embodiment of the present invention.
Figure 9:
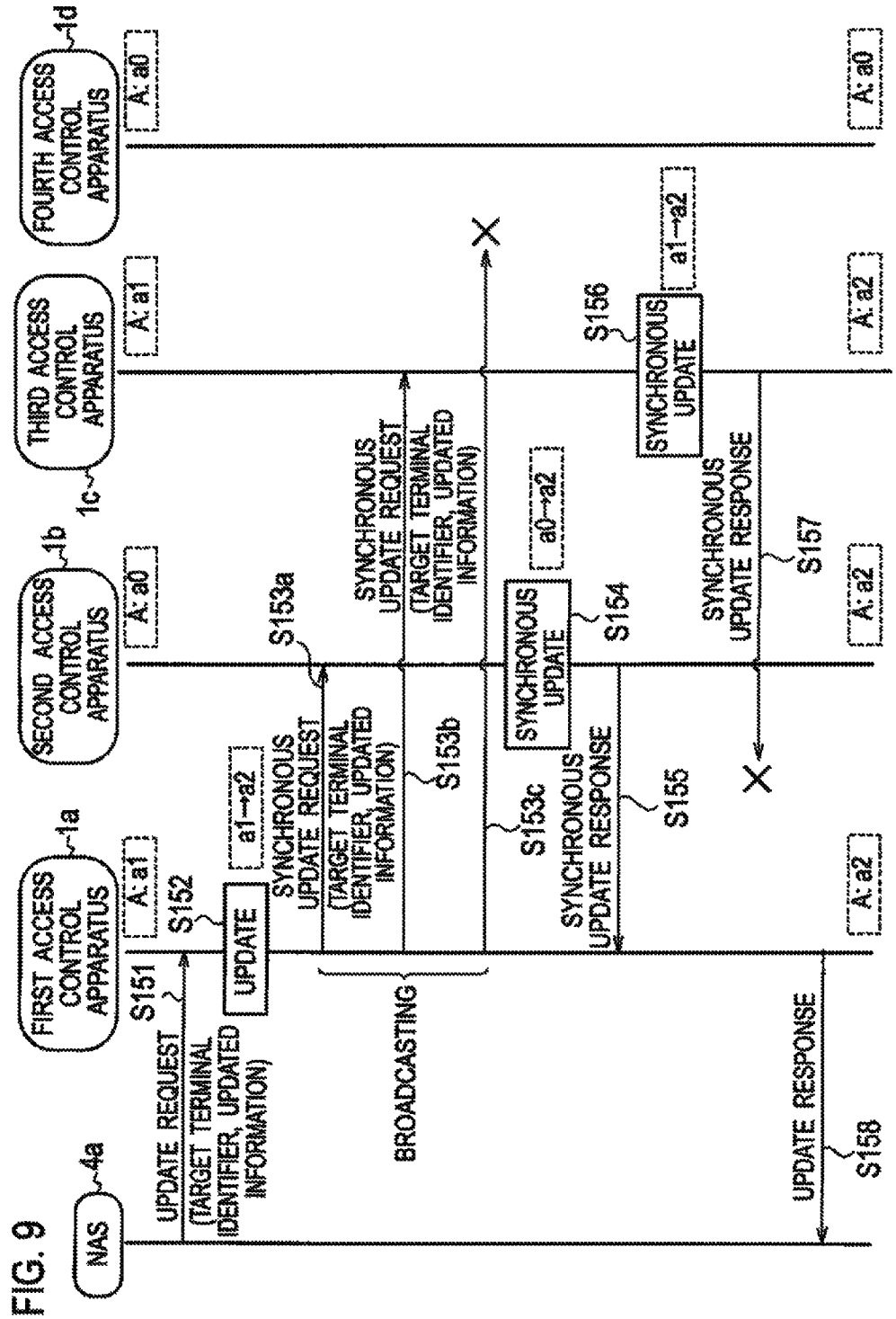
FIG. 9 is a sequence diagram describing operations of the access control system during the update process in the presence of nodes that are usable to perform synchronous update, in the communication system according to the embodiment of the present invention.

As in the case of FIG. 8, the second access control apparatus 1b normally receives a synchronous update request and sends a synchronous update response to the first access control apparatus 1a. Specifically, upon receipt of the synchronous update request, the second access control apparatus 1b changes the session information of the identifier "A" of the update-target terminal from "a0" to "a2" in step S154. When the update is complete, the second access control apparatus 1b sends the synchronous update response to the first access control apparatus 1a in step S155 in reply to the synchronous update request received in step S153a.

The third access control apparatus 1c succeeds in normally receiving the synchronous update request but fails to send a synchronous update response to the first access control apparatus 1a. Upon receipt of the synchronous update request, the third access control apparatus 1c changes the session information of the identifier "A" of the update-target terminal from "a1" to "a2" in step S156. When the update is complete, the third access control apparatus 1c attempts to send the synchronous update response to the first access control apparatus 1a in step S157 in reply to the synchronous update request received in step S153b. In the example shown in FIG. 8, however, the synchronous update response cannot reach the first access control apparatus 1a and thus fails to be received by the first access control apparatus 1a.

The fourth access control apparatus 1d does not receive the synchronous update request. In this case, the forth access control apparatus 1d does not perform the synchronous update and, as a matter of course, does not send any synchronous update response. Accordingly, in the session data of the fourth access control apparatus 1d, the session information of the identifier "A" of the update-target terminal remains as "a0".

Here, the first access control apparatus 1a having broadcast the synchronous update request receives the synchronous update request from only one node, i.e., the second access control apparatus 1b. Thus, the first access control apparatus 1a can send an update response in step S158 if the setting is such that an update response can be sent upon receipt of a synchronous update response from one or more access control apparatuses. On the other hand, the first access control apparatus 1a cannot send an update response in step S158 if the setting is such that an update response can be sent only upon receipt of synchronous update responses from two or more access control apparatuses. In this case, the NAS 4a sends the update request again, for example.

Figure 10:
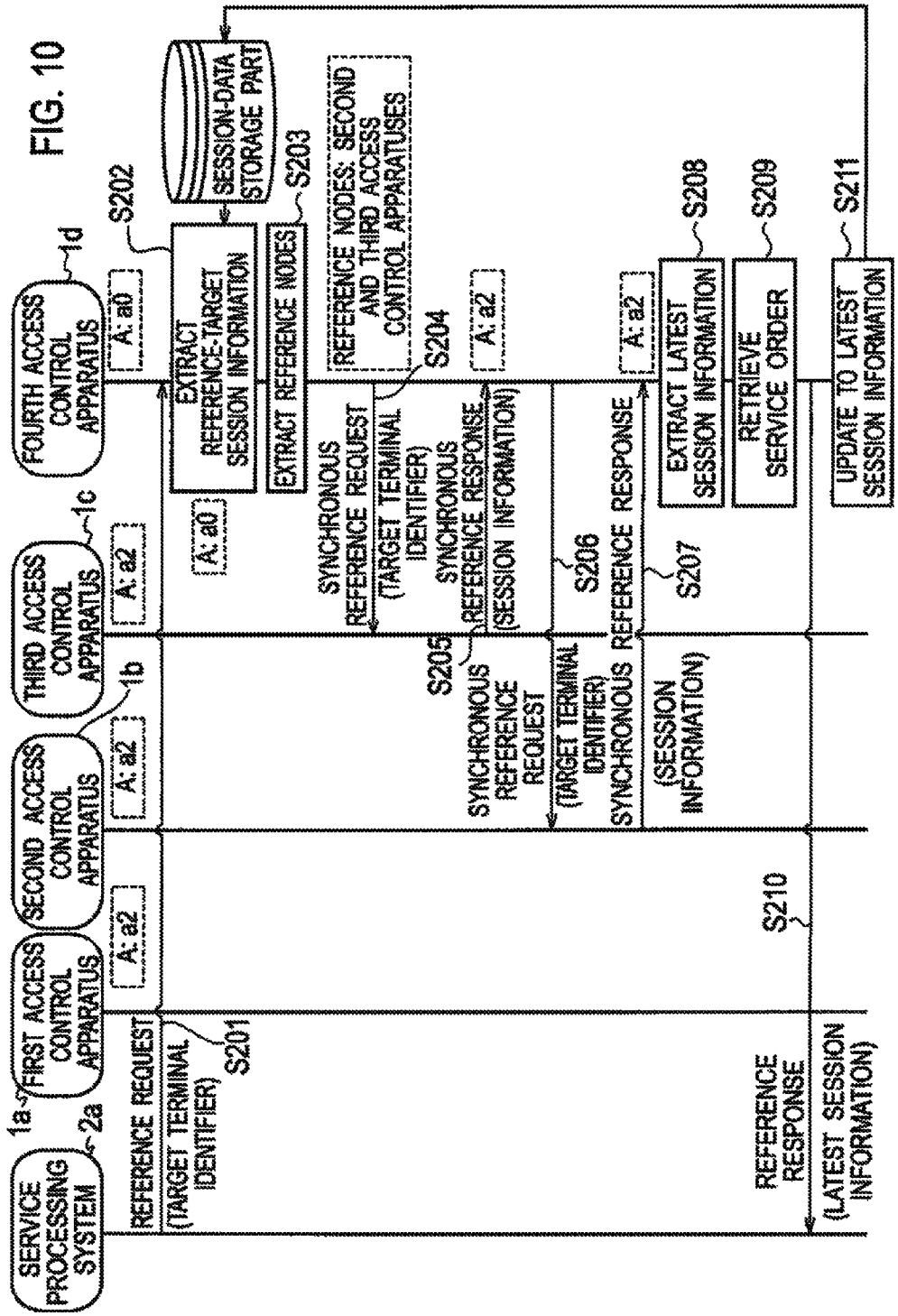
FIG. 10 is a sequence diagram describing operations of the access control system during a reference process in the communication system according to the embodiment of the present invention.

Even when the session information is not updated in all the access control apparatuses as described above, the access control system 10 according to the embodiment of the present invention can acquire the latest session information. This process will be described with reference to FIG. 10. In FIG. 10, the latest session information "a2" is associated as the session information on the terminal with the identifier "A" in the first access control apparatus 1a, the second access control apparatus 1b, and the third access control apparatus 1c. On the other hand, the older session information "a0" is associated as the session information on the terminal with the identifier "A" in the fourth access control apparatus 1d. FIG. 10 describes a case where the reference means 14 of the fourth access control apparatus 1d holding the older session information receives a reference request for the terminal identifier "A," and the synchronous reference means 13 of the second access control apparatus 1b and the third access control apparatus 1c receive a synchronous reference request.

First, in step S201, the fourth access control apparatus 1d receives a reference request. In step S202, the fourth access control apparatus 1d reads oat the session data 21a from the session-data storage part 21 and extracts the session information on the reference-target user terminal. Here, the reference request contains the identifier of the reference-target user terminal. In step S202, the fourth access control apparatus 1d extracts the session information associated with the identifier of the reference-target user terminal from the session data 21a. In this example, the session information "a0" is associated with the terminal identifier "A" in the session data 21a of the fourth access control apparatus 1d. Thus, in step S202, the fourth access control apparatus 1d acquires the session information "a0" and its update time.

Then, in step S203, the fourth access control apparatus 1d reads out the reference-node-data storage part 23a and extracts the nodes to send a synchronous reference request. In this example, the second access control apparatus 1b and the third access control apparatus 1c are extracted as the reference nodes.

Then, the fourth access control apparatus 1d sends the synchronous reference request to the third access control apparatus 1e in step S204 and receives a synchronous reference response in reply from the third access control apparatus 1c in step S205. The synchronous reference request contains the identifier "A" of the reference-target user terminal. Upon receipt of the synchronous reference request from the fourth access control apparatus 1d, the third access control apparatus 1c acquires the session information "a2" and its update time included under the identifier "A" of the reference-target user terminal from the session data of the fourth access control apparatus 1d. Further, in step S205, the third access control apparatus 1c sends the session information "a2" and its update time to the fourth access control apparatus 1d as a synchronous reference response in reply to step S204.

Then, the fourth access control apparatus 1d sends the synchronous reference request to the second access control apparatus 1b in step S206 and receives a synchronous reference response in reply from the second access control apparatus 1b in step S207. The synchronous reference request contains the identifier "A" of the reference-target user terminal. Upon receipt of the synchronous reference request from the fourth access control apparatus 1d, the second access control apparatus 1b acquires the session information "a2" and its update time included under the identifier "A" of the reference-target user terminal from the session data of the second access control apparatus 1b. Further, in step S207, the second access control apparatus 1b sends the session information "a2" and its update time to the fourth access control apparatus 1d as a synchronous reference response in reply to step S206.

In step S208, the fourth access control apparatus 1d acquires the latest session information. In each of steps S202, S205, and S207, the fourth access control apparatus 1d has acquired the session information on the reference-target user terminal "A" and its update time. The fourth access control apparatus 1d determines the session information with the latest update time among the acquired update times as the latest session information. In the example shown in FIG. 10, the update times received from the second access control apparatus 1b and the third access control apparatus 1c are the latest one. Thus, the fourth access control apparatus 1d sets the session information "a2" received front the second access control apparatus 1b and the third access control apparatus 1c as the latest information on the reference-target user terminal "A."

Further, in step S209, the fourth access control apparatus 1d refers to the service order data 22a to retrieve information on the service order corresponding to the reference-target user terminal "A," in a case where the reference request received in step S201 contains a service order inquiry.

In step S210, the fourth access control apparatus 1d sends a reference response to the service processing system 2a in reply to the reference request received in step S201. The reference response to be sent here contains the latest session information extracted in step S208. The reference response may further contain the information on the service order retrieved in step S209.

Thereafter, if the session information stored in the fourth access control apparatus 1d is not the latest information, the fourth access control apparatus 1d may update that session information to the latest session information. In step S211, the fourth access control apparatus 1d may record the latest session information, extracted in step S208, into the session data 21a in association with the identifier "A" of the reference-target user terminal.

Note that the operation in the step S211 is executed when necessary. This is because even if the session data recorded in the fourth access control apparatus 1d is old, the fourth access control apparatus 1d acquires the information of the other access control apparatuses 1 upon receipt of a reference request and, as a result, acquires the latest session information as described above. In addition, even if the fourth access control apparatus 1d receives a synchronous reference request from another access control apparatus and happens to send the old session information, the latest session information will eventually be extracted. It is therefore safe even if the latest session data is not recorded in the session data of the fourth session access control apparatus 1d.

Figure 11:
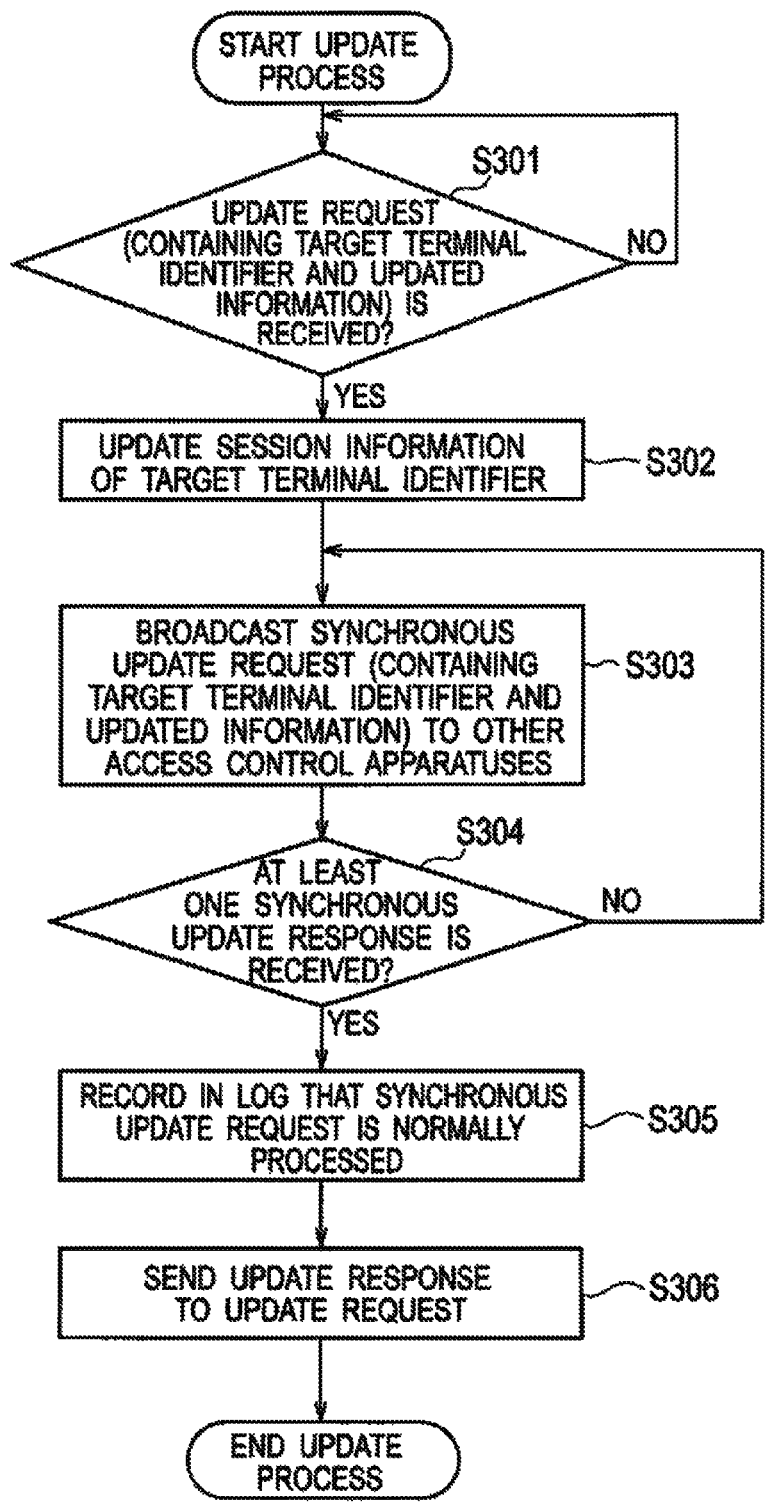
FIG. 11 is a flowchart describing the update process by update means of the access control apparatus according to the embodiment of the present invention.

The update process by the update means 12 of the access control apparatus 1a according to the embodiment of the present invention will be described with reference to FIG. 11. The update process is executed upon receipt of an update request Note that in the example shown in FIG. 11, a synchronous update request is determined as having been successfully sent when at least one synchronous update response is received.

When the update means 12 of the access control apparatus 1a receives an update request in step S301, the update means 12 proceeds to step S302. The update request contains the update-target terminal identifier and its updated session information. In step S302, the update means 12 refers to the session data 21a and updates the session information of the update-target terminal identifier to the updated session information.

Further, the update means 12 broadcasts a synchronous update request to the other access control apparatuses 1. In this event, the synchronous update request is sent to all the other access control apparatuses 1 constituting the access control system 10. The synchronous update request contains the identifier of the update-target terminal and the updated session information.

Then, in step S304, the update means 12 waits to receive at least one synchronous update response from the other access control apparatuses 1 being the broadcasting destinations. If receiving no synchronous update response within a predetermined period of time, the update means 12 returns to step S303 and broadcasts the synchronous update request again.

If receiving at least one synchronous update response in step S304, the update means 12 determines that the synchronous update request has been sent successfully in step S303, and records that fact is log data in step S305. Further, in reply to the update request received in step S301, the update means 12 sends an update response to the sender of the update request in step S306.

Figure 12:
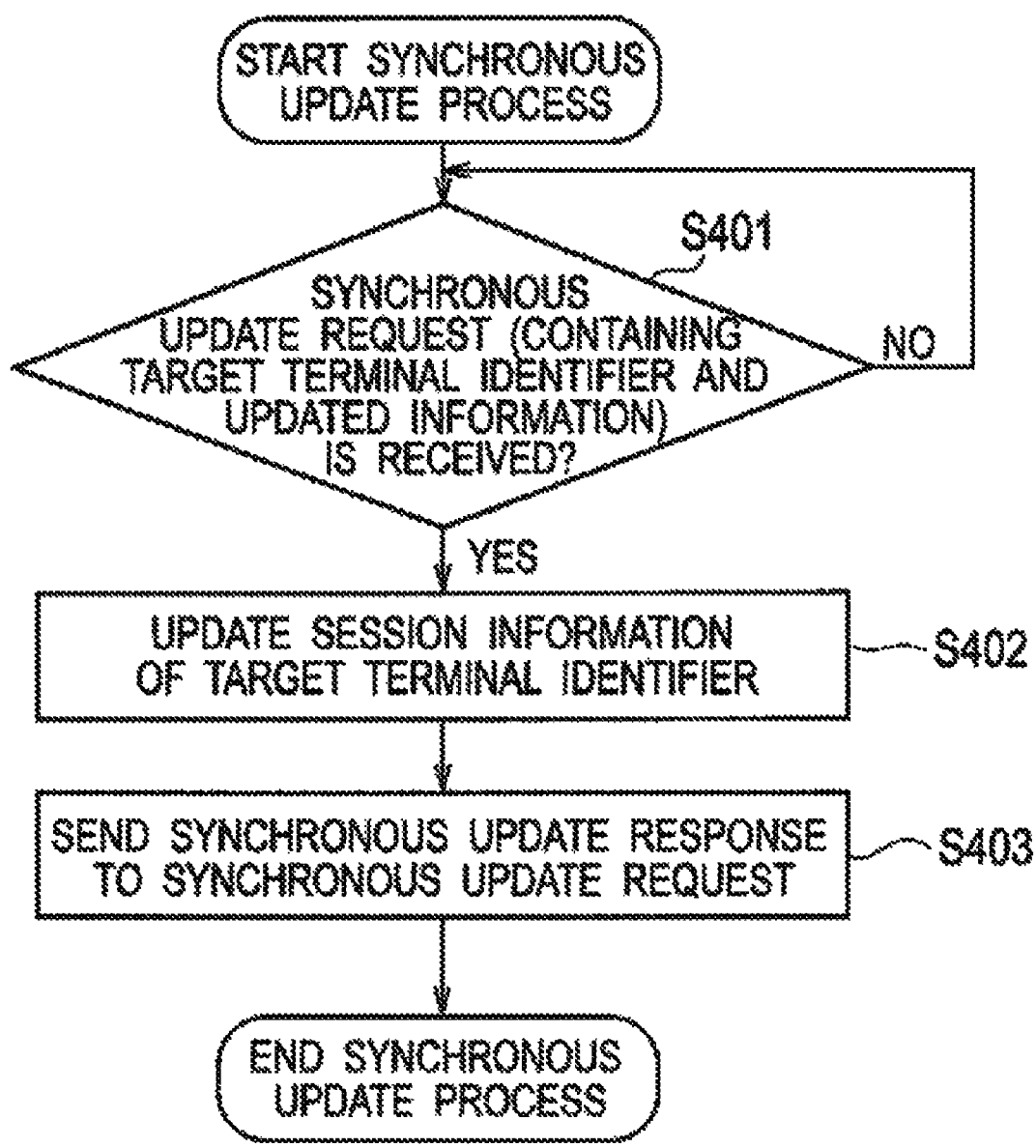
FIG. 12 is a flowchart describing a synchronous update process by synchronous update means of the access control apparatus according to the embodiment of the present invention.

Next, the synchronous update process by the synchronous update means 11 of the access control apparatus 1a according to the embodiment of the present invention will be described with reference to FIG. 12. The synchronous update process is executed upon receipt of a synchronous update request.

When the synchronous update means 11 of the access control apparatus 1a receives a synchronous update request in step S401, the synchronous update means 11 proceeds to step S402. The synchronous update request contains the update-target terminal identifier and its updated session information. In step S402, the synchronous update means 11 refers to the session data 21a and updates the session information of the update-target terminal identifier to the updated session information. Further, in reply to the synchronous update request received in step S401, the synchronous update means 11 sends a synchronous update response to the sender of the synchronous update request in step S403.

Next, the reference process by the reference means 14 of the access control apparatus 1a according to the embodiment of the present invention will be described with reference to FIG. 13. The reference process is executed upon receipt of a reference request.

When the reference means 14 of the access control apparatus 1a receives a reference request in step S501, the reference means 14 proceeds to step S502. Use reference request contains the reference-target terminal identifier. In step S502, the reference means 14 refers to the session data 21a and extracts the session information of the reference-target terminal identifier and its update time.

Then, in step S503, the update means 14 extracts the inquiry condition for a synchronous reference request and the identifiers of the access control apparatuses to send the synchronous reference request, from the reference node data 23a. In step S304, the update means 14 sends the synchronous reference request to the sending-destination access control apparatuses acquired in step S503. This synchronous reference request contains the update-target terminal identifier, in this steps the synchronous reference request is sent according to the inquiry condition acquired in step S503.

Thereafter, the reference means 14 determines whether or not a synchronous reference response is received. The reference means 14 proceeds to step S506 if determining in step S505 that the timeout is reached without receiving any synchronous reference response and that the number of retries exceeds the limit. In step S506, the reference means 14 deletes the identifier of the access control apparatuses 1 extracted. In step S503 from the reference node list or invalidates the identifier. Further, in steps S503 and S504, the reference means 14 extracts a new sending-destination node and re-sends the synchronous reference request thereto.

On the other hand, in step S505, if at least one synchronous reference response is received, the reference means 14 determines that the synchronous reference request sent in step S304 is successfully sent. In this ease, the reference means 14 proceeds to step S507.

In step S507, the reference means 14 determines whether or not the synchronous reference responses are received from all the reference nodes to which the synchronous reference request is sent in step S504. Each synchronous reference response contains the session information on the reference-target user terminal and its update time that are acquired at the corresponding access control apparatus 1. If not determining in step S507 that responses are not obtained from all the reference nodes, the reference means 14 deletes the identifier of each access control apparatus 1 from which the response is not obtained, from the reference node list, or invalidates it in step S508.

Then, in step S509, the reference means 14 acquires the latest session information on the basis of the session information acquired in step S502 and the session information acquired in step S507. Specifically, the reference means 14 acquires the session information with the latest update time as the latest session information.

In step S510, in reply to the reference request received in step S501, the reference means 14 sends a reference response to the sender of the reference request. This reference response contains the latest session information acquired in step S509. Further, in step S511, the reference means 14 may update the session data 21a by associating the latest session information, acquired in step S509, with the identifier of the reference-target user terminal.

Figure 13:
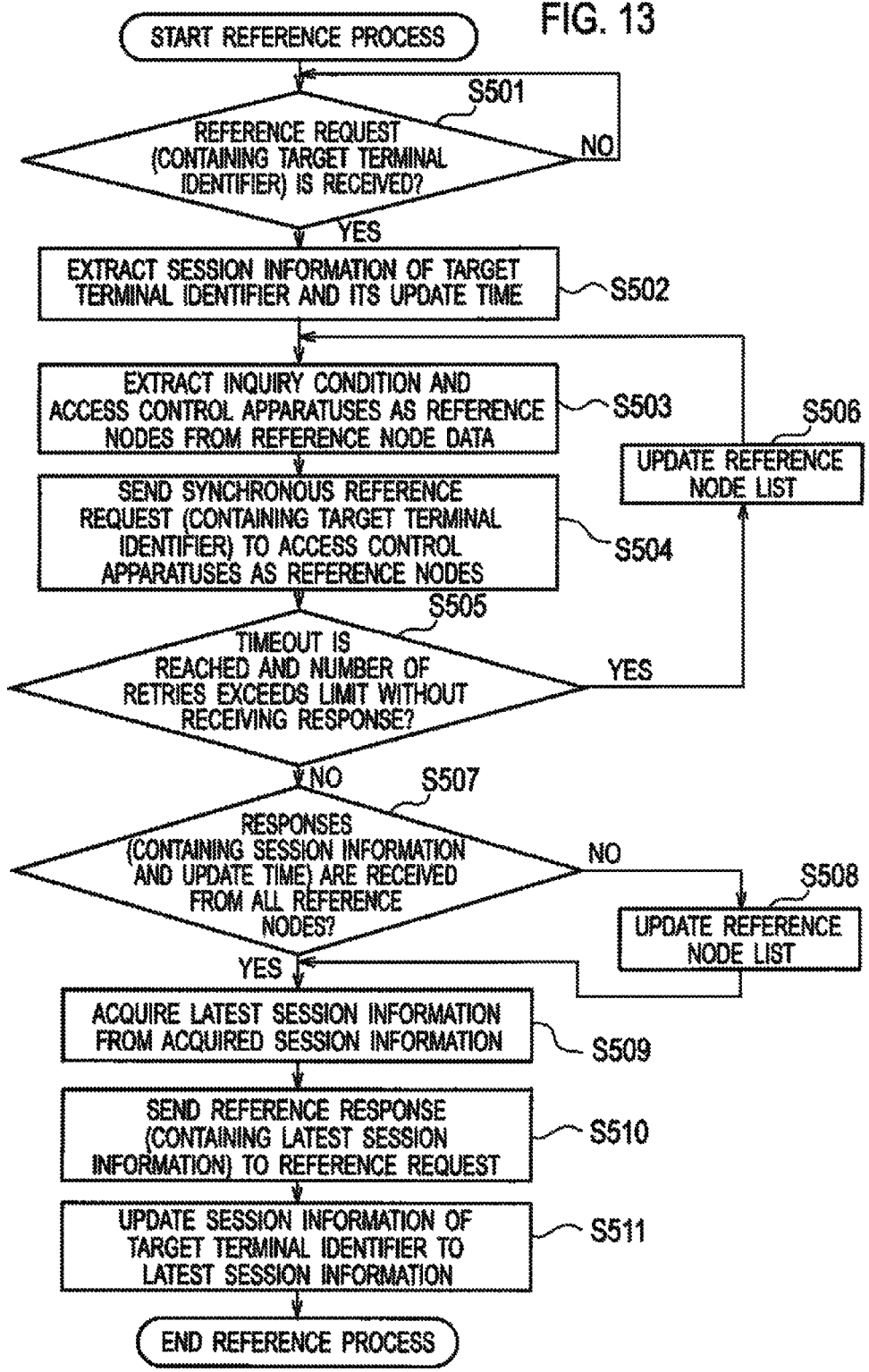
FIG. 13 is a flowchart describing the reference process by reference means of the access control apparatus according to the embodiment of the present invention.

Note that the reference node list invalidated in step S506 and/or S508 in FIG. 13 is validated by the reference-node update means 15. For example, when a normal-activation management command is inputted to an access control apparatus 1, the reference-node update means 15 updates, to a valid state, the valid flag associated with the IP address of the access control apparatus recovered to a normal state. Moreover, the reference-node update means 15 inserts a record attaining the IP address and the port number of the access control apparatus recovered to a normal state into the reference node data 23a.

Figure 14:
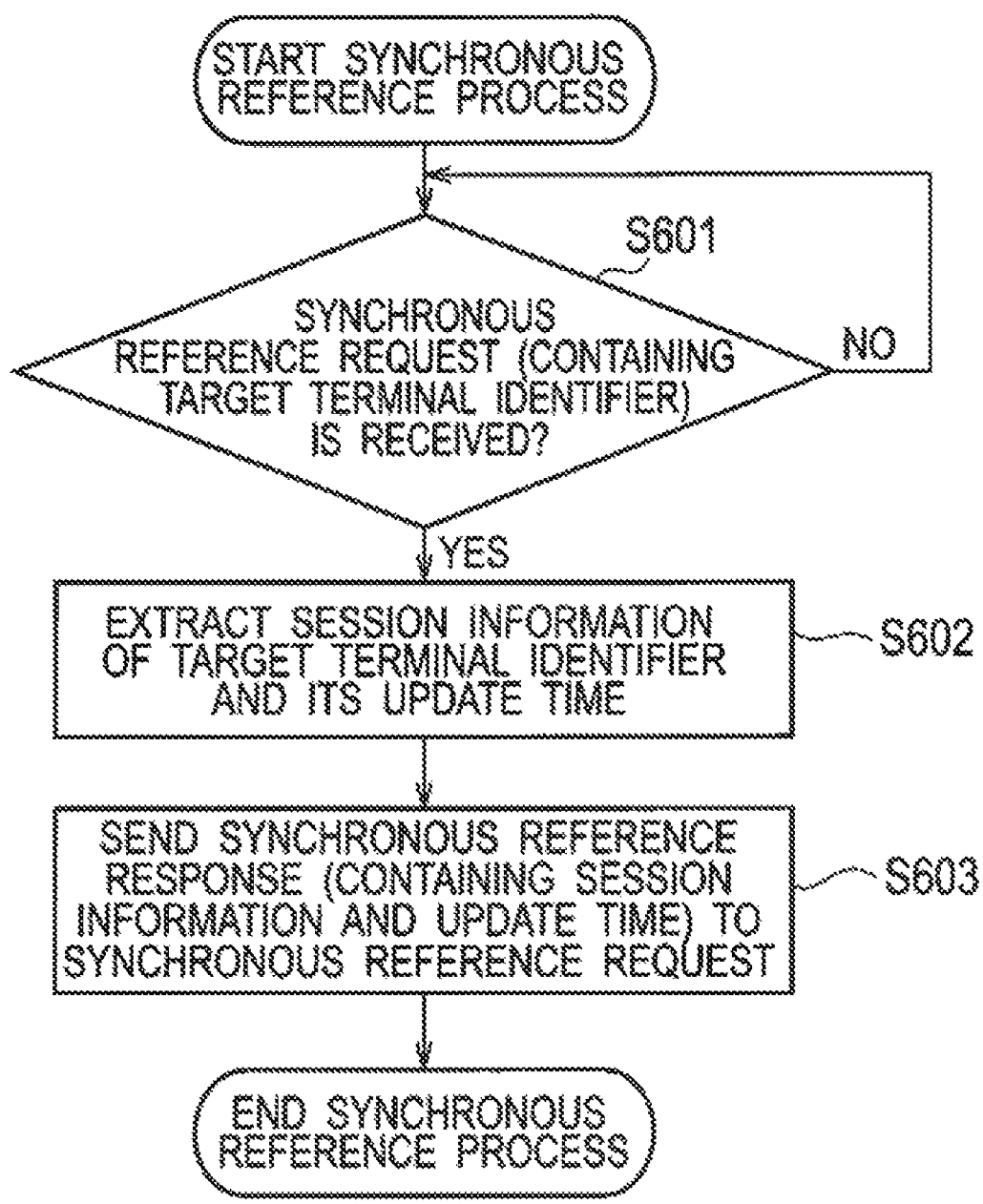
FIG. 14 is a flowchart describing a synchronous reference process by synchronous reference means of the access control apparatus according to the embodiment of the present invention.

Next, the synchronous reference process by the synchrotrons reference means 13 of the access control apparatus 1a according to the embodiment of the present invention will be described with reference to FIG. 14. The synchronous update process is executed upon receipt of a synchronous update request.

When the synchronous reference means 13 of the access control apparatus 1a receives a synchronous reference request in step S601, the synchronous reference means 13 proceeds to step S602. The synchronous reference request contains the reference-target terminal identifier. In step S602, the synchronous reference means 13 refers to the session data 21a and acquires the session information of the reference-target terminal identifier and its update time. Further, in step S603, in reply to the synchronous reference request received in step S601, the synchronous reference means 13 sends a synchronous reference response to the sender of the synchronous reference request. This synchronous reference response contains the session information and the update time acquired in step S602.

As described above, the access control system 10 according to the embodiment of the present invention includes multiple access control apparatuses 1. When any of the multiple access control apparatuses 1 receives an update request for given session information, the access control apparatus 1 having received the update request updates the session information. Further, the access control apparatus 1 having received the update request makes the other access control apparatuses 1 update the session information therein.

Moreover, when any of the multiple access control apparatuses 1 receives a reference request for given session information, the access control apparatus 1 having received the reference request acquires the session information. Further, the access control apparatus 1 having received the reference request acquires the session information from each of the other access control apparatuses 1. The access control apparatus 1 having received the reference request returns the latest session information among the acquired session information.

Since the access control apparatuses 1 cooperate with each other as described above, the access control system 10 can, as a whole, improve the reliability of its session management.

According to this access control system 10, even if a failure occurs in an access control apparatus 1 constituting the access control system 10, another access control apparatus 1 can instead perform the access management. Moreover, even if the number of accesses increases, a new access control apparatuses) 1 can be installed easily.

Further, when an access control apparatus 1 receives an update request, the access control apparatus 1 broadcasts a synchronous update request to the other access control apparatuses 1. Accordingly, the load on the access control apparatus 1 can be reduced. Furthermore, when an access control apparatus 1 receives a reference request, the access control apparatus 1 having received the reference request acquires the session information stored in itself and also acquires the session information from the other access control apparatuses 1. By acquiring multiple sets of session information as described above to extract the latest session information, reliable session information can be provided.

Moreover, according to the access control system 10 according to the embodiment of the present invention, the reliability required for the system can be satisfied by adjusting the number of access control apparatuses 1 or doing the like. For example, the number of access control apparatuses can be increased when high reliability is required, and the number of access control apparatuses can be reduced when high reliability is not required.

Alternatively, when high reliability is required, such a requirement may be satisfied by increasing the number of nodes to be inquired in the reference node data 23a described in connection with FIG. 7 or by increasing the threshold for the synchronous update response in step S304 in FIG. 11.

In contrast, when high reliability is not required, the synchronous update responses sent in steps S105, S107, and S109 in FIG. 8 may be omitted; the synchronous update request is broadcast in steps S103a, S103b, and S103c, and the update response in step S110 is sent thereafter. Moreover, in step S211 in FIG. 10, the access control apparatus may not have to update its own session data to the latest session data even if the session data is old.

As described above, the access control system 10 according to the embodiment of the present invention is applicable to systems in various fields. Accordingly, it is possible to reduce the development cost and the installation cost of the system as a whole.

Other Embodiments

Although an embodiment of the present invention has been described hereinabove, it should not be understood that the statement and the drawings constituting part of this disclosure limit this invention. Various alternative embodiments, examples, and operation techniques become apparent to those skilled in the art from this disclosure.

For example, each access control apparatus described in the embodiment of the present invention may be configured on one set of hardware as shown in FIG. 3, or configured on multiple sets of hardware in accordance with its function and the number of processes. Moreover, the access control apparatus may be implemented on an existing communication system.

It is apparent that the present invention includes various embodiments and the like that are not described herein. Therefore, the technical scope of the present invention shall be determined solely by the specified matters in the invention according to the claims that are appropriate from the above description.

EXPLANATION OF THE REFERENCE NUMERALS 1 access control apparatus
2 service processing system
3 user terminal
4 NAS
5 communication network
6 access control network
10 access control system
11 synchronous update means
12 update means
13 synchronous reference means
14 reference means
15 reference-node update means
21 session-data storage part
22 service-order-data storage part
23 reference-node-data storage part
101 central process control device
102 ROM
103 RAM
104 input device
105 display device
106 communication control device
107 storage device
108 removable disk
109 I/O interface
110 bus

The invention claimed is:

1. An access control method for use in an access control system in which a plurality of access control apparatuses are connected bidirectionally by a communication network, each of the access control apparatuses including a session-data storage part in which session information on a user terminal is recorded, the access control method comprising the steps of:

causing any one of the plurality of access control apparatuses to receive an update request for session information;

causing the access control apparatus having received the update request to update the session-data storage part of the access control apparatus having received the update request in association with an update time;

causing the access control apparatus having received the update request to broadcast a synchronous update request that requests update of the session information;

causing each of the access control apparatuses having received the synchronous update request to update the session-data storage part of the access control apparatus having received the synchronous update request on the basis of the synchronous update request in association with the update time;

causing any one of the plurality of access control apparatuses to receive a reference request for the session information;

causing the access control apparatus having received the reference request to acquire reference-target session information and the update time thereof from the session-data storage part of the access control apparatus having received the reference request;

causing the access control apparatus having received the reference request to send the other access control apparatuses a synchronous reference request that requests reference to the session information;

causing each of the access control apparatuses having received the synchronous reference request to acquire the reference-target session information and the update time thereof from the session-data storage part of the access control apparatus having received the synchronous reference request and to send the session information and the update time to the access control apparatus having received the reference request; and causing the access control apparatus having received the reference request to extract the latest session information by comparing the session information and the update time acquired from the session-data storage part of the access control apparatus having received the reference request and the session information and the update lime received from each of the access control apparatuses having received the synchronous reference request, and to send the latest session information as a reference response in reply to the reference request.

2. The access control method according to claim 1, further comprising the step of causing the access control apparatus having received the reference request to store the latest session information into the session-data storage part of the access control apparatus having received the reference request.

3. The access control method according to claim 1, further comprising the steps of:

causing each of the access control apparatuses having received the synchronous update request to send a synchronous update response to the access control apparatus having received the update request in reply to the synchronous update request after updating the session-data storage part of the access control apparatus having received the synchronous update request; and causing the access control apparatus having received the update request to send an update response in reply to the update request upon receipt of a predetermined number or more of the synchronous update responses.

4. An access control apparatus for use in an access control system including a plurality of the access control apparatuses which record session information on a user terminal, the access control apparatus comprising:

a session-data storage part for storing session data in which an identifier of a user terminal, session information, and an update time are associated with each other;

update means for, upon receipt of an update request containing the identifier of an update-target user terminal and updated session information, storing the updated session information into the session-data storage part in association with an update time, and broadcasting, to the other access control apparatuses, a synchronous update request that requests update of the session information of the identifier of the update-target user terminal;

synchronous update means for, upon receipt of the synchronous update request from any of the other access control apparatuses, updating the session-data storage part on the basis of the synchronous update request in association with the update time;

reference means for, upon receipt of a reference request, acquiring reference-target session information and the update time thereof from the session-data storage part and sending a synchronous reference request to the other access control apparatuses, and also for acquiring the reference-target session information and the update time thereof from each of the other access control apparatuses, extracting the latest session information by comparing the session information and the update time acquired from the session-data storage part and the session information and the update time received from each of the other access control apparatuses, and sending the latest session information as a reference response in reply to the reference request; and synchronous reference means for, upon receipt of the synchronous reference request from any of the other access control apparatuses, acquiring the reference-target session information and the update time thereof from the session-data storage part and sending the session information and the update time to the other access control apparatuses.

5. The access control apparatus according to claim 4, wherein the reference means further stores the latest session information into the session-data storage part.

6. The access control apparatus according to claim 4, wherein when the update is complete, the synchronous update means further sends a synchronous update response to the any of the other access control apparatuses in reply to the synchronous update request, and upon receipt of a predetermined number or mom of the synchronous update responses, the update means further sends an update response in reply to the update request.

7. The access control apparatus according to claim 6, wherein upon receipt of the predetermined number or more of the synchronous update responses, the update means further records in log data that the synchronous update request has been broadcast successfully.

8. The access control apparatus according to claim 4, further comprising a reference-node-data storage part, for storing reference node data in which the identifiers of sending-destination nodes of the reference request are stored, wherein the reference means sends the synchronous reference request to the nodes stored in the reference node data.

9. The access control apparatus according to claim 8, further comprising reference-node update means for removing, from the reference node data, the identifier of the sending-destination node which is unable to receive the reference request.

10. An access control program being on a non-transitory computer-readable storage medium for use in an access control apparatus in an access control system including a plurality of the access control apparatuses which record session information on a user terminal, wherein the access control program causes a computer to function as:

session-data storage means for storing session data in which an identifier of a user terminal, session information, and an update time are associated with each other;

update means for, upon receipt of an update request containing the identifier of an update-target user terminal and updated session information, storing the updated session information into the session-data storage part in association with an update time, and broadcasting, to the other access control apparatuses, a synchronous update request that requests update of the session information of the identifier of the update-target user terminal;

synchronous update means for, upon receipt of the synchronous update request from any of the other access control apparatuses, updating the session-data storage part on the basis of the synchronous update request in association with the update time;

reference means for, upon receipt of a reference request, acquiring reference-target session information and the update time thereof from the session-data storage part and sending a synchronous reference request to the other access control apparatuses, and also for acquiring the reference-target session information and the update time thereof from each of the other access control apparatuses, extracting the latest session information by comparing the session information and the update time acquired from the session-data storage part and the session information and the update time received from each of the other access control apparatuses, and sending the latest session information as a reference response in reply to the reference request; and synchronous reference means for, upon receipt of the synchronous reference request from any of the other access control apparatuses, acquiring the reference-target session information and the update time thereof from the session-data storage part and sending the session information and the update time to the other access control apparatuses.

* * * * *